(12) United States Patent
Eo et al.

(10) Patent No.: US 10,495,191 B1
(45) Date of Patent: Dec. 3, 2019

(54) TRANSMISSION OF MOTOR DRIVING VEHICLE

(71) Applicants: Hyundai Motor Company, Seoul (KR); Kia Motors Corporation, Seoul (KR)

(72) Inventors: Soon Ki Eo, Ansan-si (KR); Woo Churl Son, Seongnam-si (KR); Woo Jin Chang, Suwon-si (KR)

(73) Assignees: Hyundai Motor Company, Seoul (KR); Kia Motors Cjorporation, Seoul (KR)

( * ) Notice: Subject to any disclaimer, the term of this patent is extended or adjusted under 35 U.S.C. 154(b) by 0 days.

(21) Appl. No.: 16/169,162

(22) Filed: Oct. 24, 2018

(30) Foreign Application Priority Data

May 25, 2018 (KR) .......................... 10-2018-0059413

(51) Int. Cl.
| | |
|---|---|
| *F16H 3/66* | (2006.01) |
| *B60K 6/36* | (2007.10) |
| *B60K 6/48* | (2007.10) |
| *B60K 6/547* | (2007.10) |
| *B60W 20/00* | (2016.01) |

(52) U.S. Cl.
CPC .............. *F16H 3/666* (2013.01); *B60K 6/36* (2013.01); *B60K 6/48* (2013.01); *B60K 6/547* (2013.01); *F16H 3/66* (2013.01); *B60W 20/00* (2013.01); *F16H 2200/2094* (2013.01); *F16H 2200/2097* (2013.01)

(58) Field of Classification Search
None
See application file for complete search history.

(56) References Cited

U.S. PATENT DOCUMENTS

| | | | | |
|---|---|---|---|---|
| 5,513,719 | A * | 5/1996 | Moroto | B60K 6/24 180/65.21 |
| 2011/0143874 | A1* | 6/2011 | Tangl | B60W 20/30 475/5 |
| 2015/0204424 | A1* | 7/2015 | Mei ner | F16H 3/725 475/5 |
| 2016/0102742 | A1* | 4/2016 | Lee | B60K 6/36 475/5 |
| 2017/0282700 | A1* | 10/2017 | Bergquist | B60K 6/365 |
| 2019/0126736 | A1* | 5/2019 | Aoki | B60K 6/365 |

FOREIGN PATENT DOCUMENTS

KR  10-2017-0018220 A  2/2017

* cited by examiner

*Primary Examiner* — Justin Holmes
(74) *Attorney, Agent, or Firm* — Morgan, Lewis & Bockius LLP

(57) ABSTRACT

A transmission of a motor driving vehicle, may include an input shaft connected to a driving motor and including a first clutch and a second clutch, a planetary gear set including a first rotation element directly connected to the input shaft, a second rotation element connected to the input shaft through the first clutch, and a third rotation element being able to be restrained from rotation, a gear pair configured to transmit power to the output shaft through the planetary gear set, a gear pair configured to transmit power to the input shaft without change, and additional clutches configured to control connection of the gear pairs and connection of rotation elements of the planetary gear set.

7 Claims, 15 Drawing Sheets

TRANSMISSION OF MOTOR DRIVING VEHICLE

CROSS REFERENCE TO RELATED APPLICATION

The present application claims priority to Korean Patent Application No. 10-2018-0059413, filed on May 25, 2018, the entire contents of which is incorporated herein for all purposes by this reference.

BACKGROUND OF THE INVENTION

Field of the Invention

The present invention relates to a transmission of a motor driving vehicle, and more particularly, to a configuration of a power train for sufficiently ensuring driving performance of a vehicle while using a driving motor with as small capacity as possible.

Description of Related Art

A hybrid vehicle or an electric vehicle is capable of providing driving force required for driving a vehicle by a driving motor and, in this regard, a cost of the driving motor mostly increases in proportion to capacity or size thereof and, when the capacity or size of the driving motor is increased, although a range of driving force to be provided is widened, an increase in capacity or size of the driving motor is a factor for lowering fuel efficiency due to an increase in vehicle weight.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a transmission of a motor driving vehicle for providing a high reduction change gear ratio while reducing a size and weight of a transmission by reducing a wheel space of the transmission and minimizing the number of used gears to embody a compact configuration and, thus, driving performance such as highest speed, acceleration performance, and hill-climbing capability of the vehicle may be sufficiently ensured while a driving motor with as small capacity as possible is used and fuel efficiency may be enhanced and required driving performance of a vehicle may be ensured while a cost for vehicle manufacture is reduced, maximizing productivity of the vehicle.

According to an exemplary embodiment of the present invention, there is provided a transmission of a motor driving vehicle, including an input shaft connected to a driving motor and including a first clutch and a second clutch, a planetary gear set including a first rotation element directly connected to the input shaft, a second rotation element connected to the input shaft through the first clutch, and a third rotation element being able to be restrained from rotation, a first drive gear integrated into the second rotation element of the planetary gear set, an output shaft including an output gear and disposed in parallel to the input shaft, a first driven gear engaged with the first drive gear and rotatably disposed on the output shaft, a second drive gear rotatably disposed on the input shaft to be connected to the input shaft through the second clutch, a second driven gear engaged with the second drive gear and disposed on the output shaft, a third clutch disposed to connect or disconnect the first driven gear to or from the output shaft, a fourth clutch configured to connect the second drive gear to the input shaft, and a fifth clutch disposed to connect the third rotation element of the planetary gear set to the first drive gear or to restrain rotation.

The planetary gear set may be a single pinion planetary gear set, the first rotation element of the planetary gear set may be a sun gear, the second rotation element may be a planet carrier, and the third rotation element may be a ring gear.

The first clutch and the second clutch may include a friction clutch with adjustable transfer torque, and the third clutch, the fourth clutch, and the fifth clutch may include a gear engagement-type clutch having no power consumption while being maintained in an engagement state.

The gear engagement-type clutch may include a synchronization engagement device including a synchronizer ring configured to perform a synchronization operation.

The gear engagement-type clutch may include a dog clutch.

According to various exemplary embodiments of the present invention, there is provided a transmission of a motor driving vehicle, including an input shaft connected to a driving motor and including a first clutch and a second clutch, a planetary gear set including a first rotation element directly connected to the input shaft, a second rotation element connected to the input shaft through the first clutch, and a third rotation element being able to be restrained from rotation, a first drive gear integrated into the second rotation element of the planetary gear set, an output shaft including an output gear and disposed in parallel to the input shaft, a first driven gear engaged with the first drive gear and rotatably disposed on the output shaft, a second drive gear rotatably disposed on the input shaft to be connected to the input shaft through the second clutch, a second driven gear engaged with the second drive gear and rotatably disposed on the output shaft, a third clutch disposed to connect or disconnect the first driven gear to or from the output shaft, a fourth clutch configured to connect the second drive gear to the input shaft, a fifth clutch disposed to connect the third rotation element of the planetary gear set to the first drive gear or to restrain rotation, and a sixth clutch disposed to connect or disconnect the second driven gear to or from the output shaft.

According to various exemplary embodiments of the present invention, there is provided a transmission of a motor driving vehicle, including an input shaft connected to a driving motor and including a first clutch and a second clutch, a planetary gear set including a first rotation element directly connected to the input shaft, a second rotation element connected to the input shaft through the first clutch, and a third rotation element being able to be restrained from rotation, a first drive gear integrated into the second rotation element of the planetary gear set, an output shaft including an output gear and disposed in parallel to the input shaft, a first driven gear engaged with the first drive gear and rotatably disposed on the output shaft, a second drive gear rotatably disposed on the input shaft to be connected to the input shaft through the second clutch, a second driven gear engaged with the second drive gear and disposed on the output shaft, a third clutch disposed to connect or disconnect the first driven gear to or from the output shaft, a fifth clutch disposed to connect the third rotation element of the planetary gear set to the first drive gear or to restrain rotation, and a sixth clutch disposed to connect or disconnect the second driven gear to or from the output shaft.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
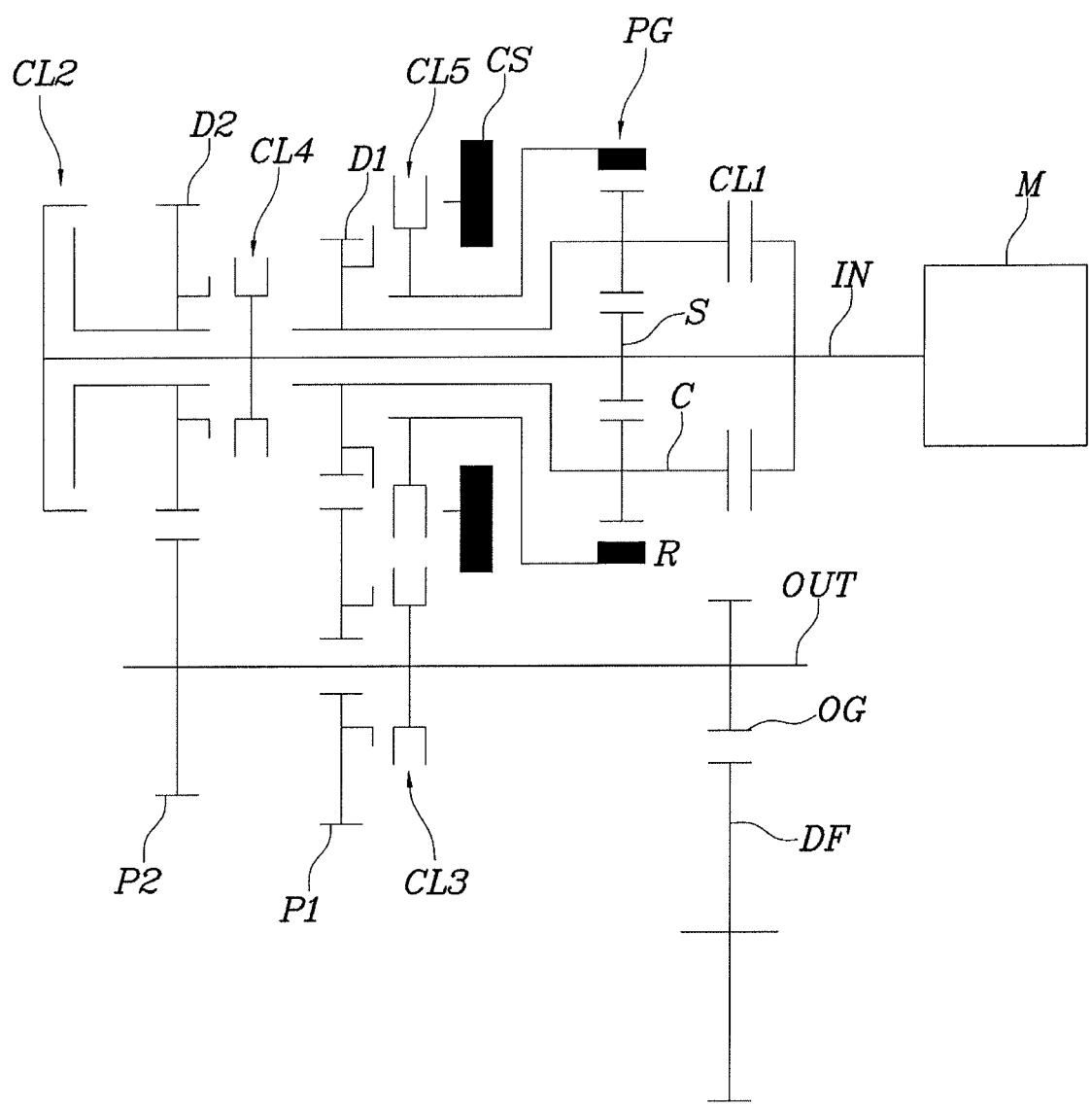
FIG. 1 is a diagram showing a structure of a transmission of a motor driving vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Referring to FIG. 1, a transmission of a motor driving vehicle according to an exemplary embodiment of the present invention may include an input shaft IN connected to a driving motor M and including a first clutch CL1 and a second clutch CL2, a planetary gear set PG including a first rotation element directly connected to the input shaft IN, a second rotation element connected to the input shaft IN through the first clutch CL1, and a third rotation element being able to be restrained from rotation, a first drive gear D1 integrated into the second rotation element of the planetary gear set PG, an output shaft OUT including an output gear OG and disposed in parallel to the input shaft IN, a first driven gear P1 engaged with the first drive gear D1 and rotatably disposed on the output shaft OUT, a second drive gear D2 rotatably disposed on the input shaft IN to be connected to the input shaft IN through the second clutch CL2, a second driven gear P2 engaged with the second drive gear D2 and disposed on the output shaft OUT, a third clutch CL3 disposed to connect or disconnect the first driven gear P1 to or from the output shaft OUT, a fourth clutch CL4 configured to connect the second drive gear D2 to the input shaft IN, and a fifth clutch CL5 disposed to connect the third rotation element of the planetary gear set PG to the first drive gear D1 or to restrain rotation.

A differential DF may be coupled to the output gear OG to directly supply power to opposite driving wheels.

According to the exemplary embodiment of the present invention, the planetary gear set PG may be a single pinion planetary gear set, the first rotation element of the planetary gear set PG may be a sun gear S, the second rotation element may be a planet carrier C, and the third rotation element may be a ring gear R.

That is, the sun gear S may be directly connected to the input shaft IN, the planet carrier C may be connected to the input shaft IN through the first clutch CL1, and the ring gear R may be disposed to restrain rotation by the fifth clutch CL5.

The first clutch CL1 and the second clutch CL2 may be configured as a friction clutch with adjustable transfer torque and the third clutch CL3, the fourth clutch CL4, and the fifth clutch CL5 may be configured as a gear engagement-type clutch that has no power consumption while being maintained in an engagement state.

That is, the gear engagement-type clutch may be configured as a synchronization engagement device including a synchronizer ring that performs a synchronization operation or may be configured as a dog clutch.

The fifth clutch CL5 may be configured as a synchronization engagement device configured to fix the ring gear R to a transmission housing CS when the device is moved to a right side from a state of FIG. 1 and to engage the ring gear R with the first drive gear D1 when the device is moved to a left side thereof.

The transmission configured as described above according to an exemplary embodiment of the present invention may form a sufficient change gear ratio while ensuring a relatively short distance of a wheel space between the input shaft IN and the output shaft OUT based on a change gear ratio through the planetary gear set PG and a change gear ratio between the first drive gear D1 and the first driven gear P1 and between the second drive gear D2 and the second driven gear P2 and, thus, the size and weight of the transmission may be reduced and a compact structure may be ensured, enhancing efficiency of a vehicle.

A speed change procedure of the transmission configured as described above according to an exemplary embodiment of the present invention is described with reference to FIGS. 2 to 13.

Figure 2:
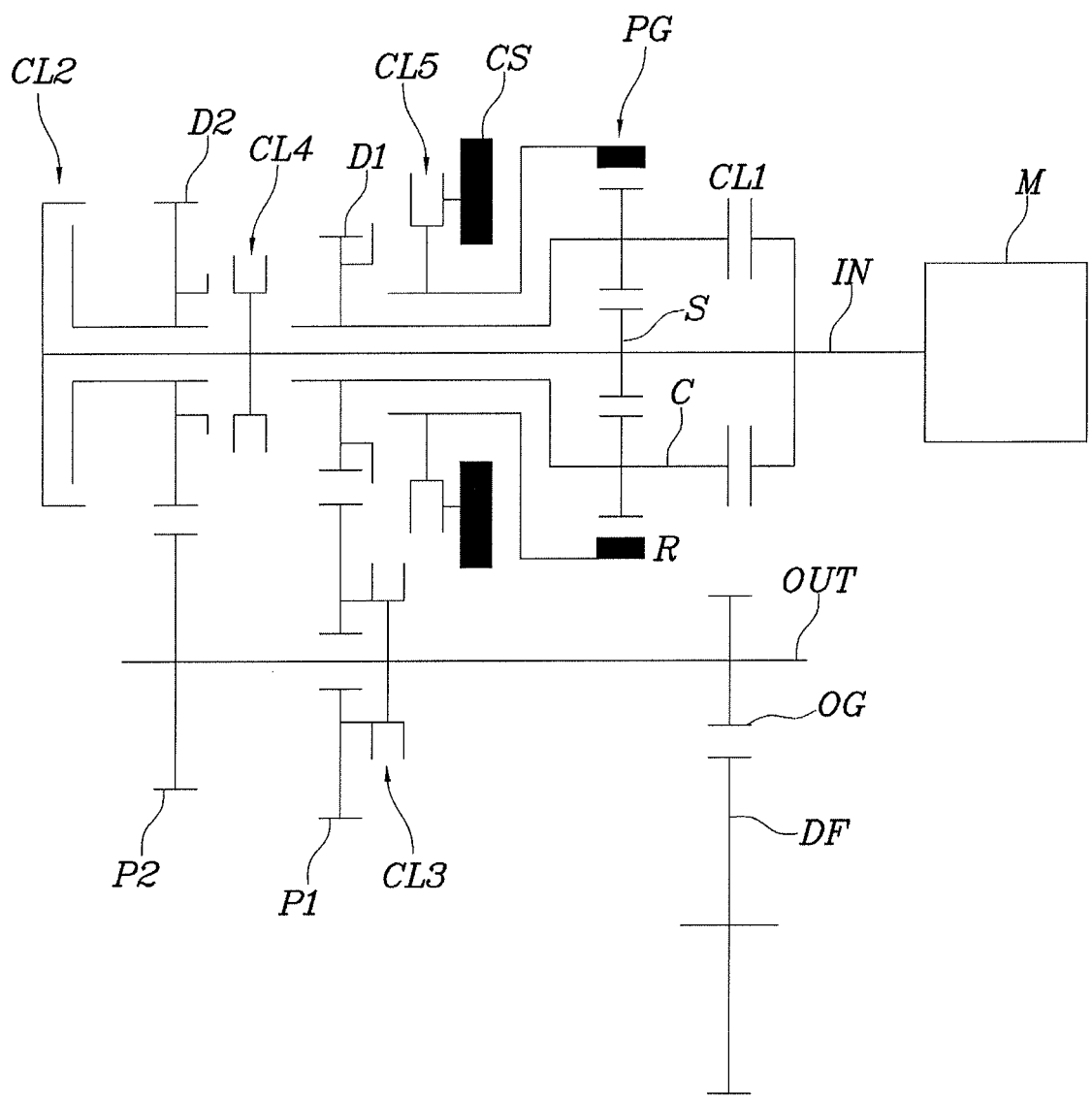
FIG. 2 is a diagram showing a state in which 1-stage driving is prepared by the transmission of FIG. 1.

FIG. 2 is a diagram showing a state in which the first driven gear P1 is connected to the output shaft OUT by the third clutch CL3 and the ring gear R is fixed by the fifth clutch CL5 for first-stage start from the state of FIG. 1.

Figure 3:
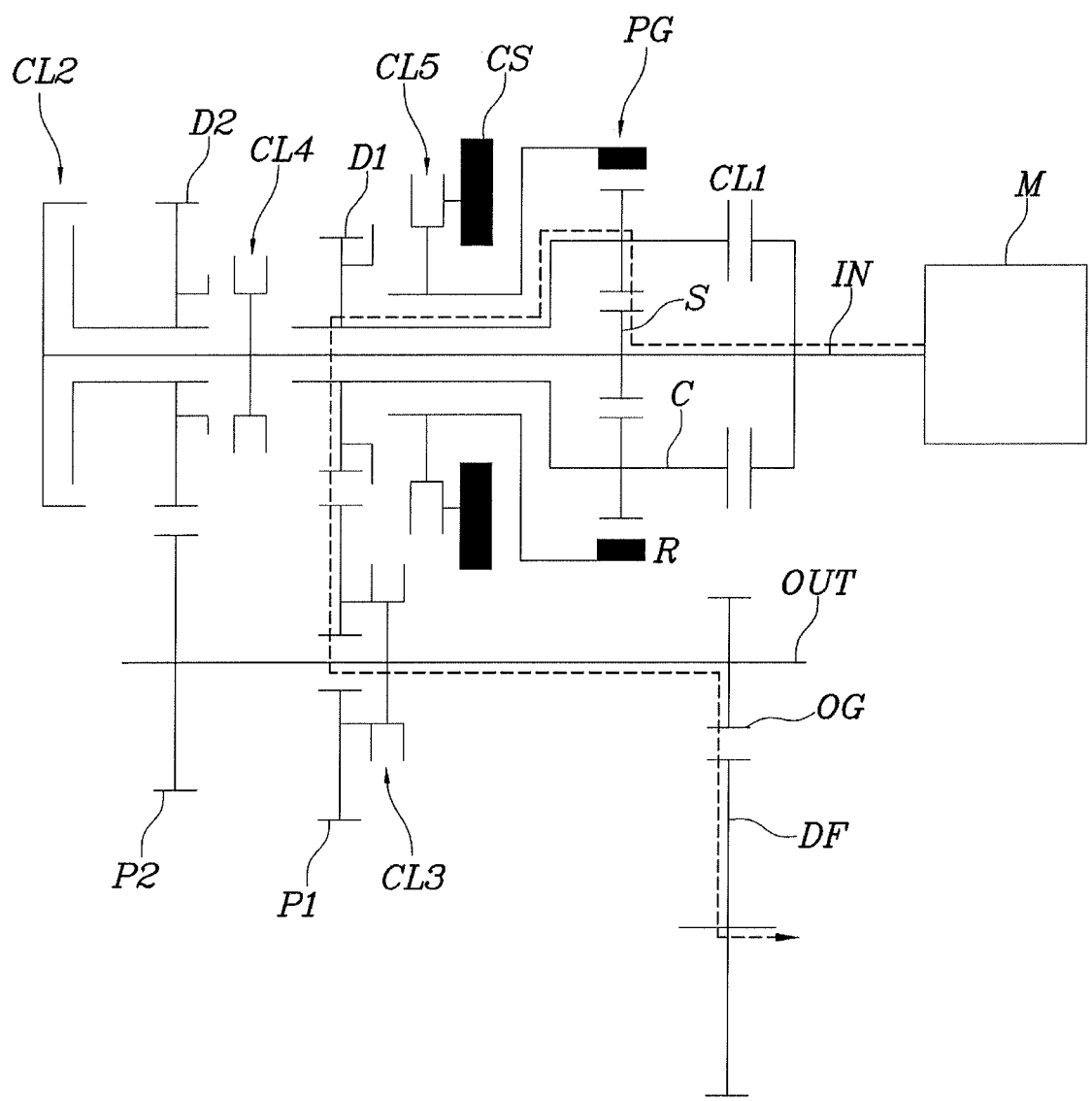
FIG. 3 is a diagram showing a state in which 1-stage driving is performed from the state of FIG. 2.

FIG. 3 is a diagram showing a state in which the driving motor M is driven in the state of FIG. 2 to reduce power by the planet carrier C of the planetary gear set PG and, then, to reduce power again by the first drive gear D1 and the first driven gear P1 to embody a first stage while supplying power to the output gear OG.

Figure 4:
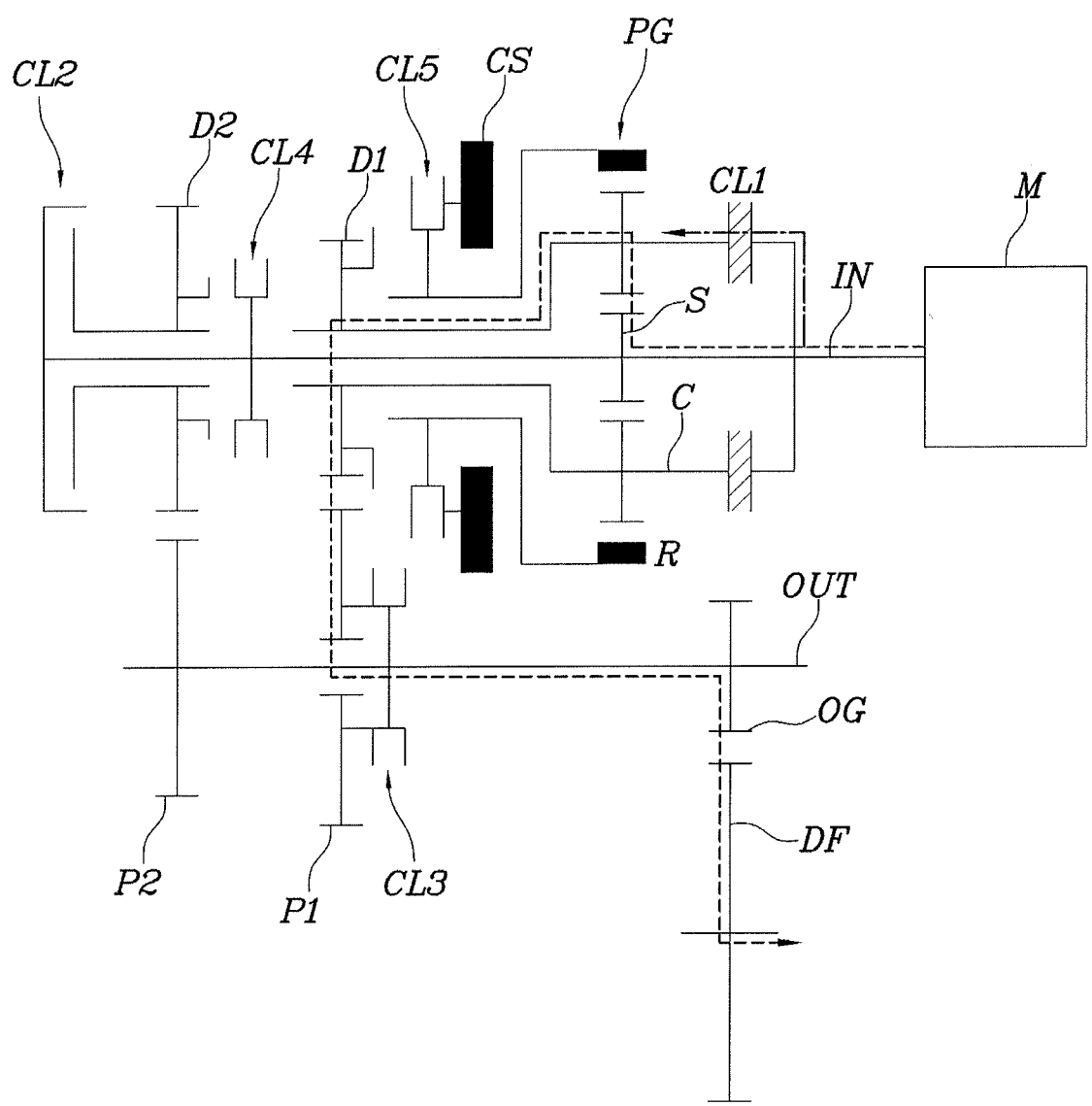
FIG. 4, FIG. 5, FIG. 6, FIG. 7, and FIG. 8 are diagrams for sequential explanation of a change speed procedure to a 2-stage from the state of FIG. 3.
Figure 5:
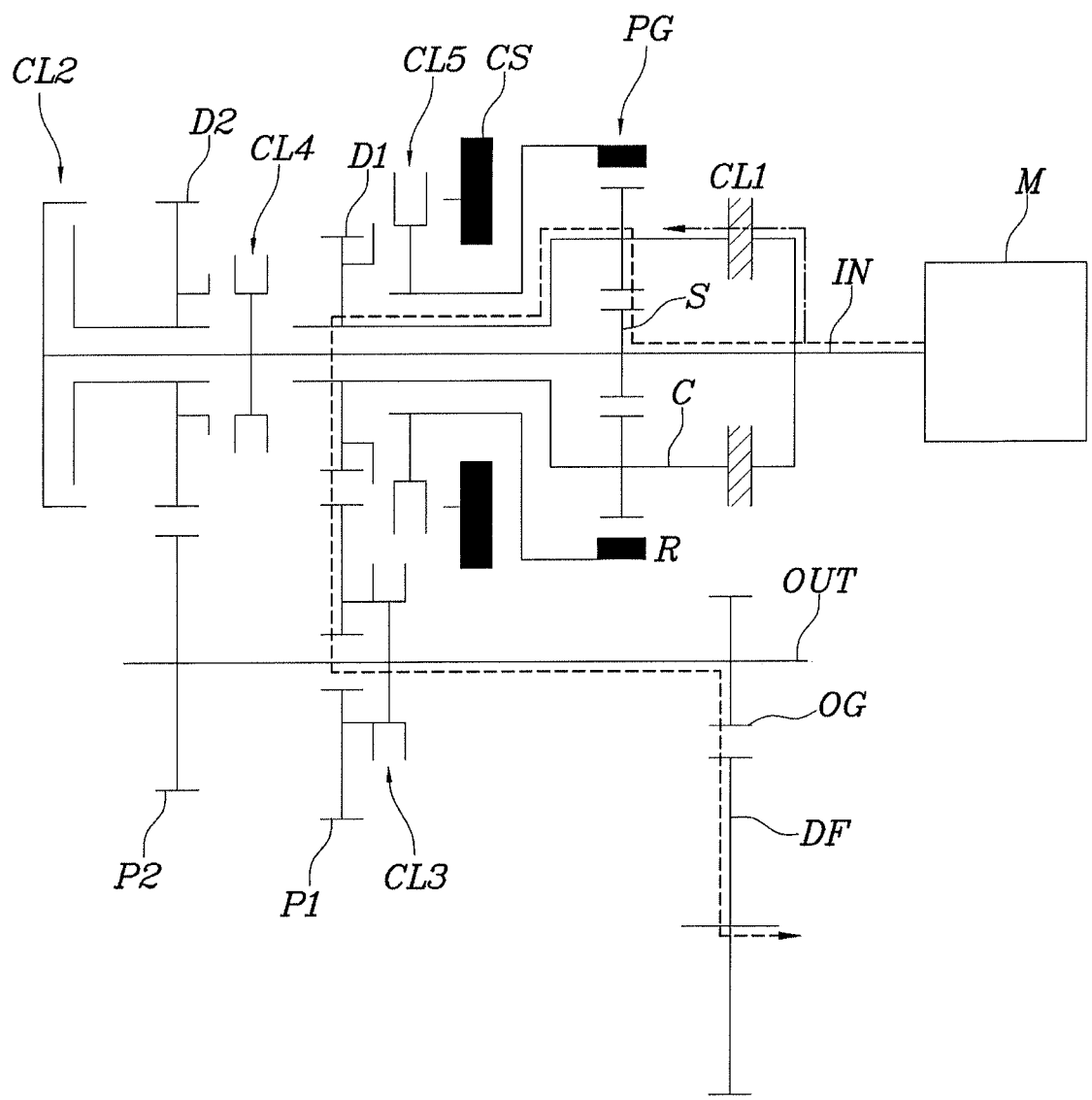

FIG. 4 and FIG. 5 show a situation in which the fifth clutch CL5 is released while torque with slip is applied to the first clutch CL1 for transmission into a second stage from the state of FIG. 3.

That is, torque applied to the first clutch CL1 may offset reaction torque between the ring gear R and the fifth clutch CL5 for fixing the ring gear R and, thus, as described above, the fifth clutch CL5 including a synchronization engagement device may be easily released to a neutral stage.

Needless to say, there is a problem in that all rotation elements of the planetary gear set PG are integrally locked when the first clutch CL1 is completely engaged and, thus, as described above, the first clutch CL1 may be controlled to slip and to transfer torque as long as the reaction torque is offset to easily release the fifth clutch CL5.

Figure 6:
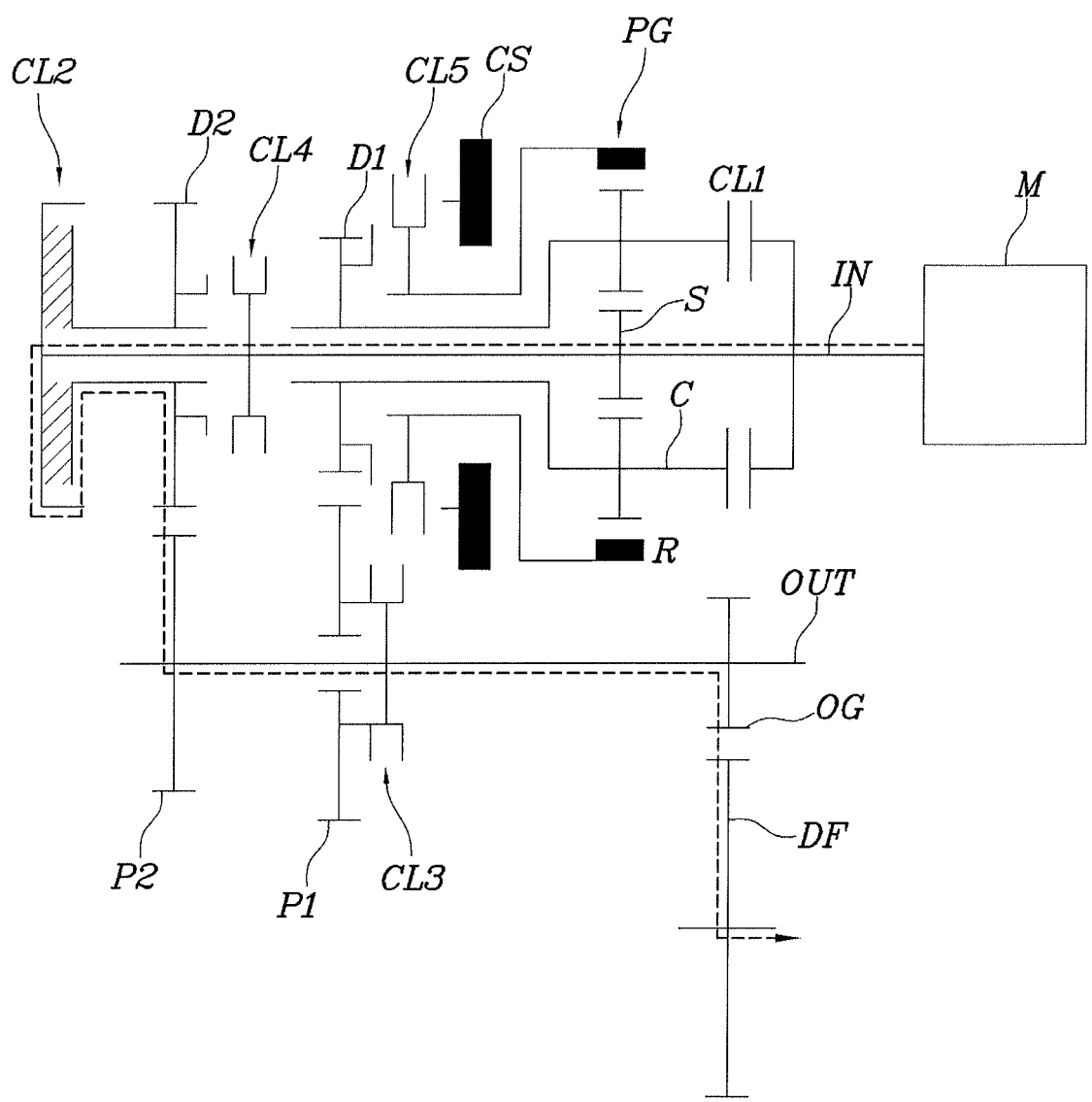

FIG. 6 is a diagram showing a state in which the fifth clutch CL5 is released to a neutral stage as shown in FIG. 5 and, then, the second clutch CL2 is engaged while the first clutch CL1 is released to begin to supply 2-stage output to the output gear OG.

That is, power of the driving motor M may be converted into a change gear ratio of the second drive gear D2 and the second driven gear P2 through the input shaft IN and the second clutch CL2 and, then, may be supplied to the output gear OG.

Figure 7:
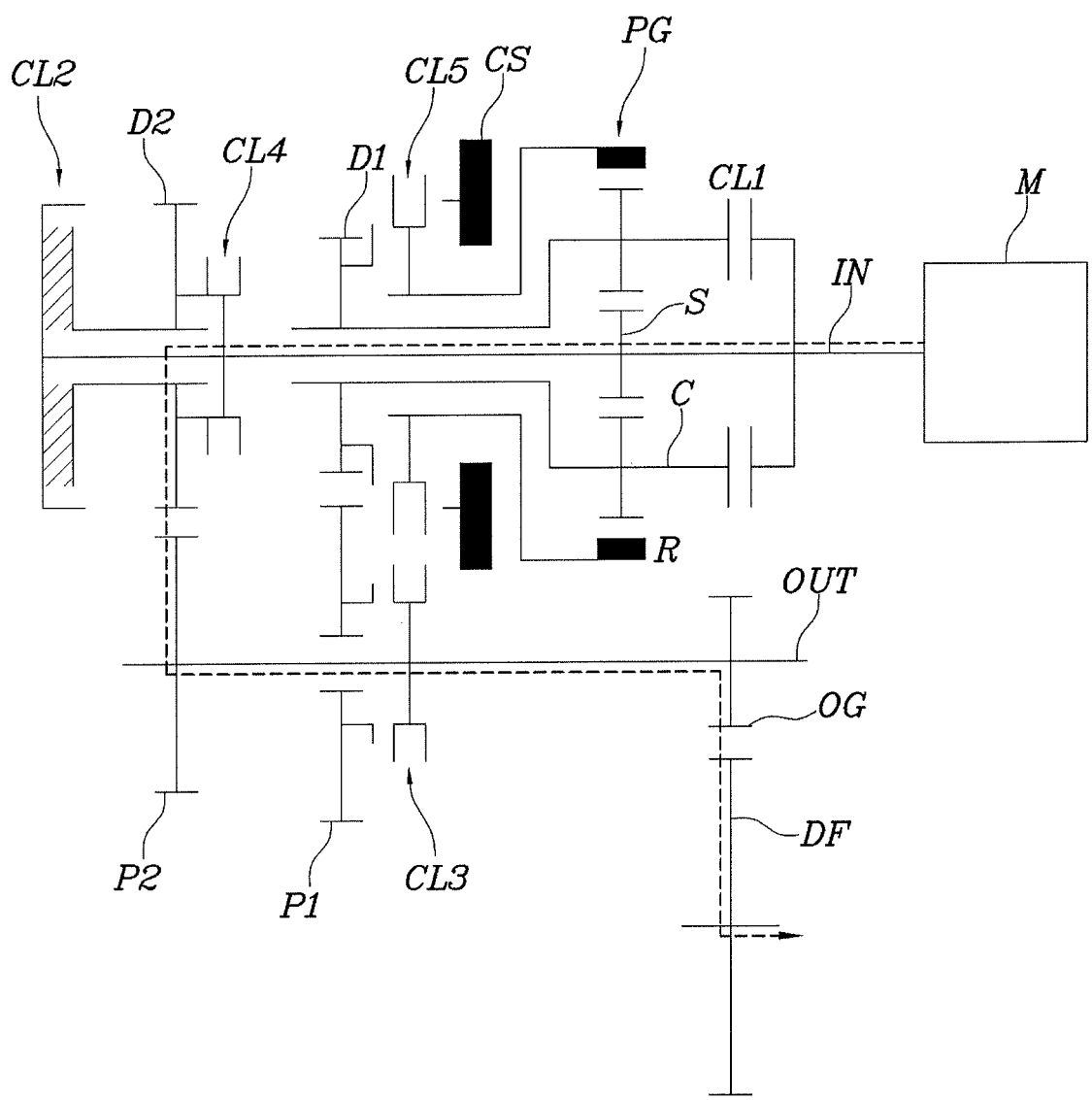
Figure 8:
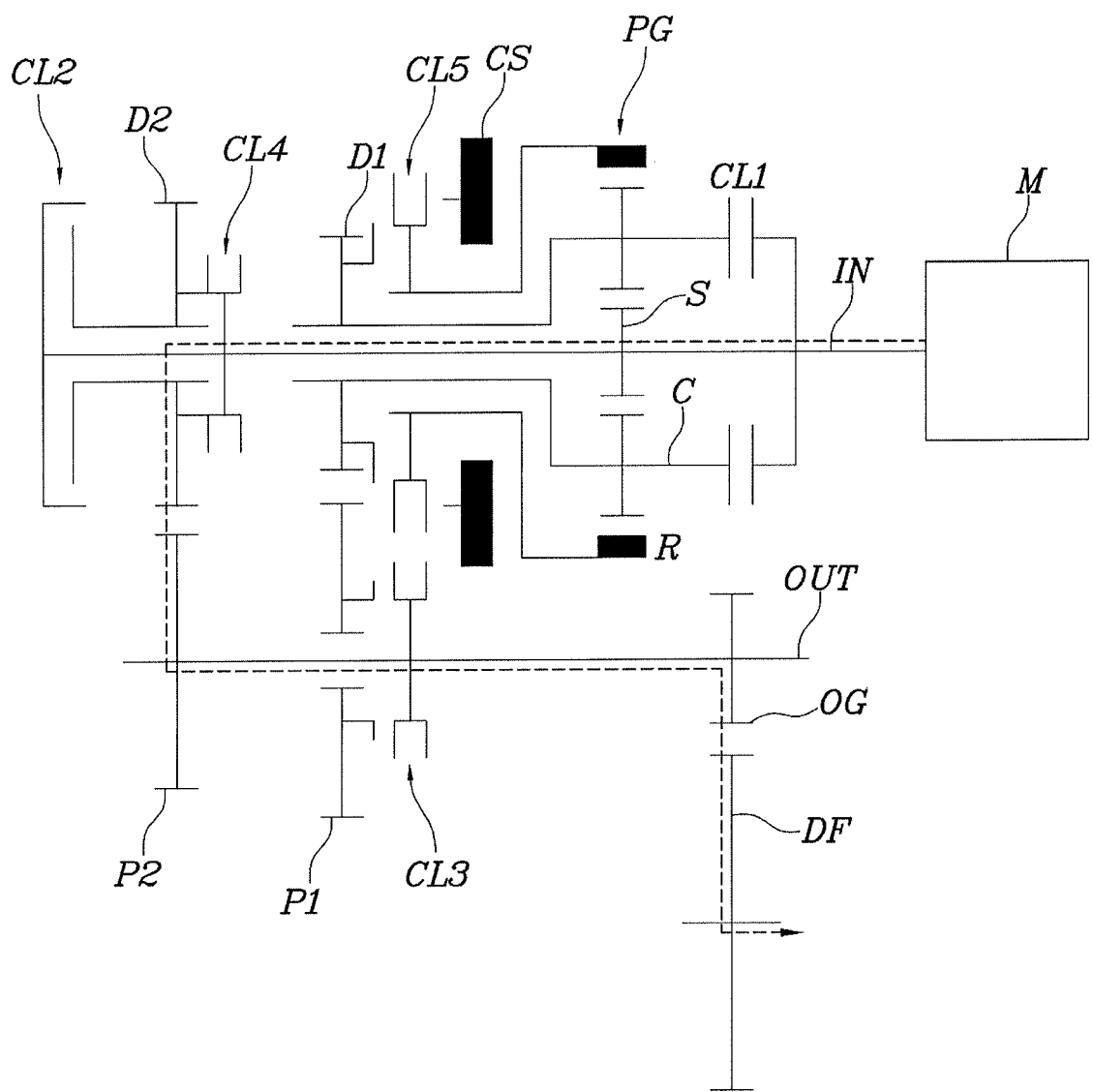

However, power for maintaining an engagement state of the second clutch CL2 configured as a friction clutch in the aforementioned state is consumed and, thus, the second drive gear D2 may be connected to the input shaft IN by the fourth clutch CL4 as shown in FIG. 7 to maintain a 2-stage driving state without power consumption and, when the second clutch CL2 is released shown in FIG. 8, the 2-stage driving state may be maintained without power consumption for maintaining the 2-stage driving state.

Figure 9:
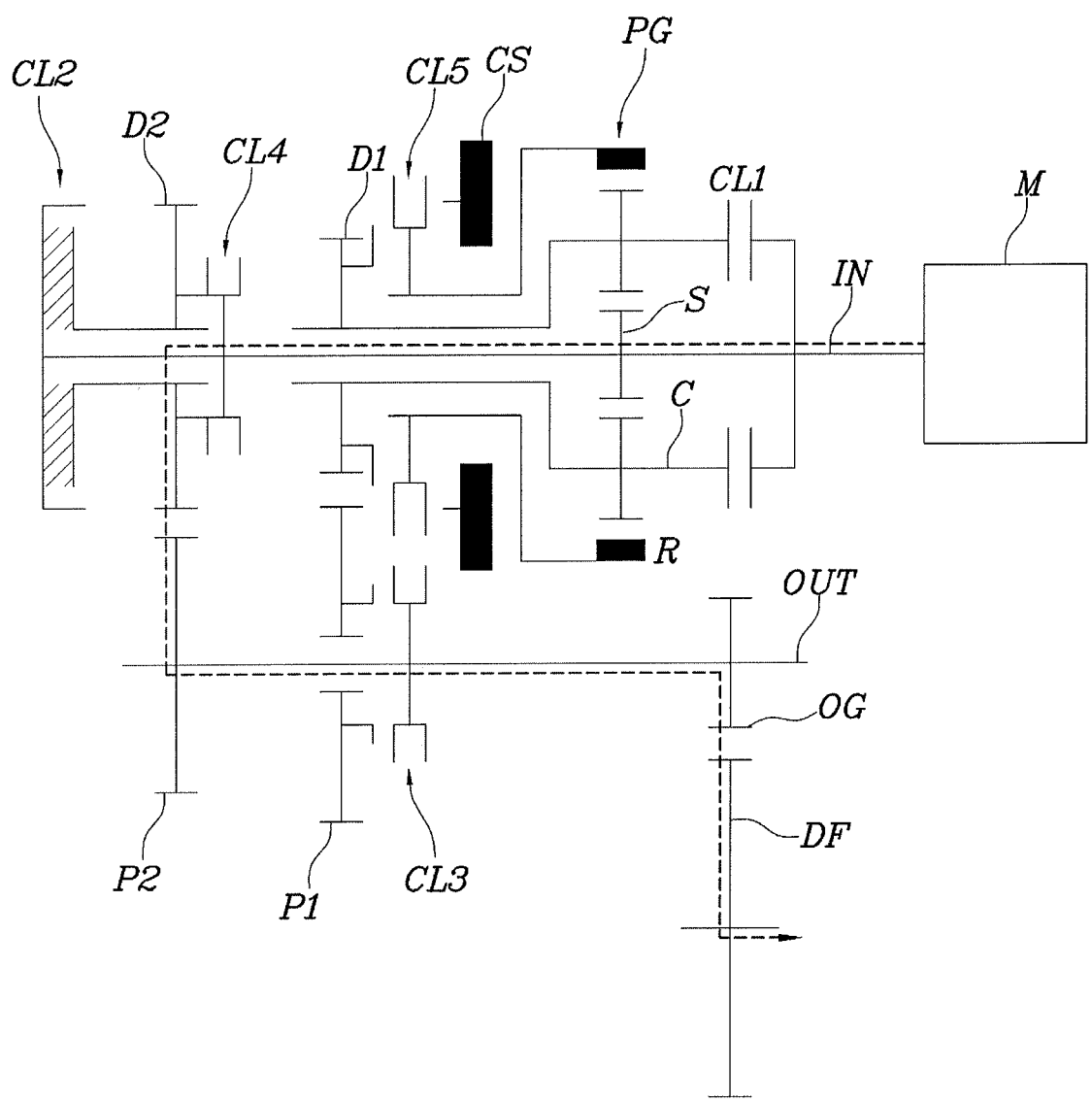
FIG. 9, FIG. 10, FIG. 11, FIG. 12, and FIG. 13 are diagrams for sequential explanation of a change speed procedure to a 3-stage from the state of FIG. 8.

FIG. 9 is a diagram showing a state in which the second clutch CL2 is engaged for transmission to a 3-stage from a 2-stage driving state shown in FIG. 8 and power from the driving motor M is transmitted to the second drive gear D2 through both the second clutch CL2 and the fourth clutch CL4 to change speed and is transmitted to the output shaft OUT.

Figure 10:
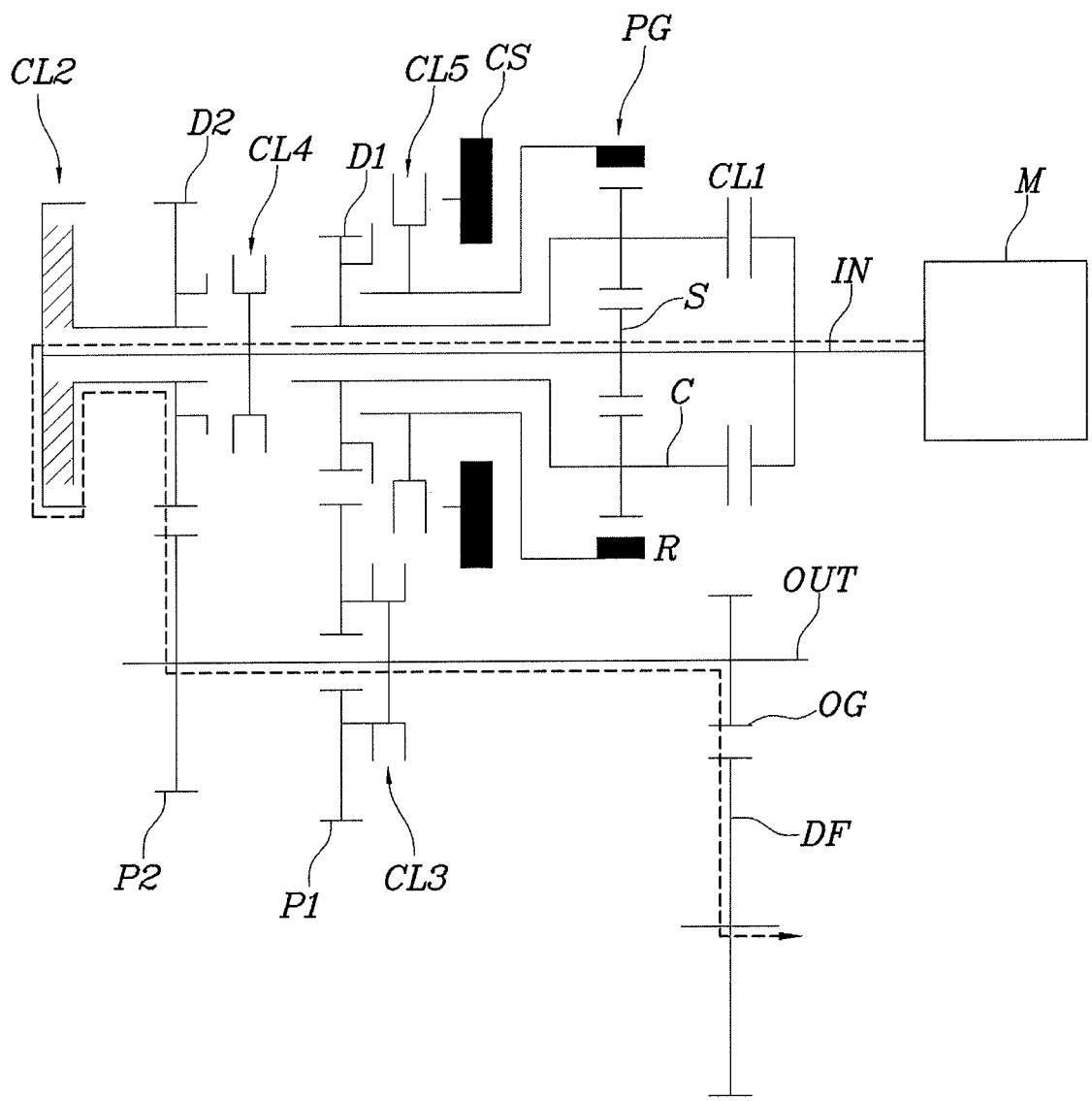

FIG. 10 is a diagram showing a state in which the fourth clutch CL4 is released from the state of FIG. 9, power is transmitted to the second drive gear D2 through only the second clutch CL2 to change speed and, then, is transmitted to the output shaft OUT, and the first driven gear P1 is connected to the output shaft OUT by the third clutch CL3.

Figure 11:
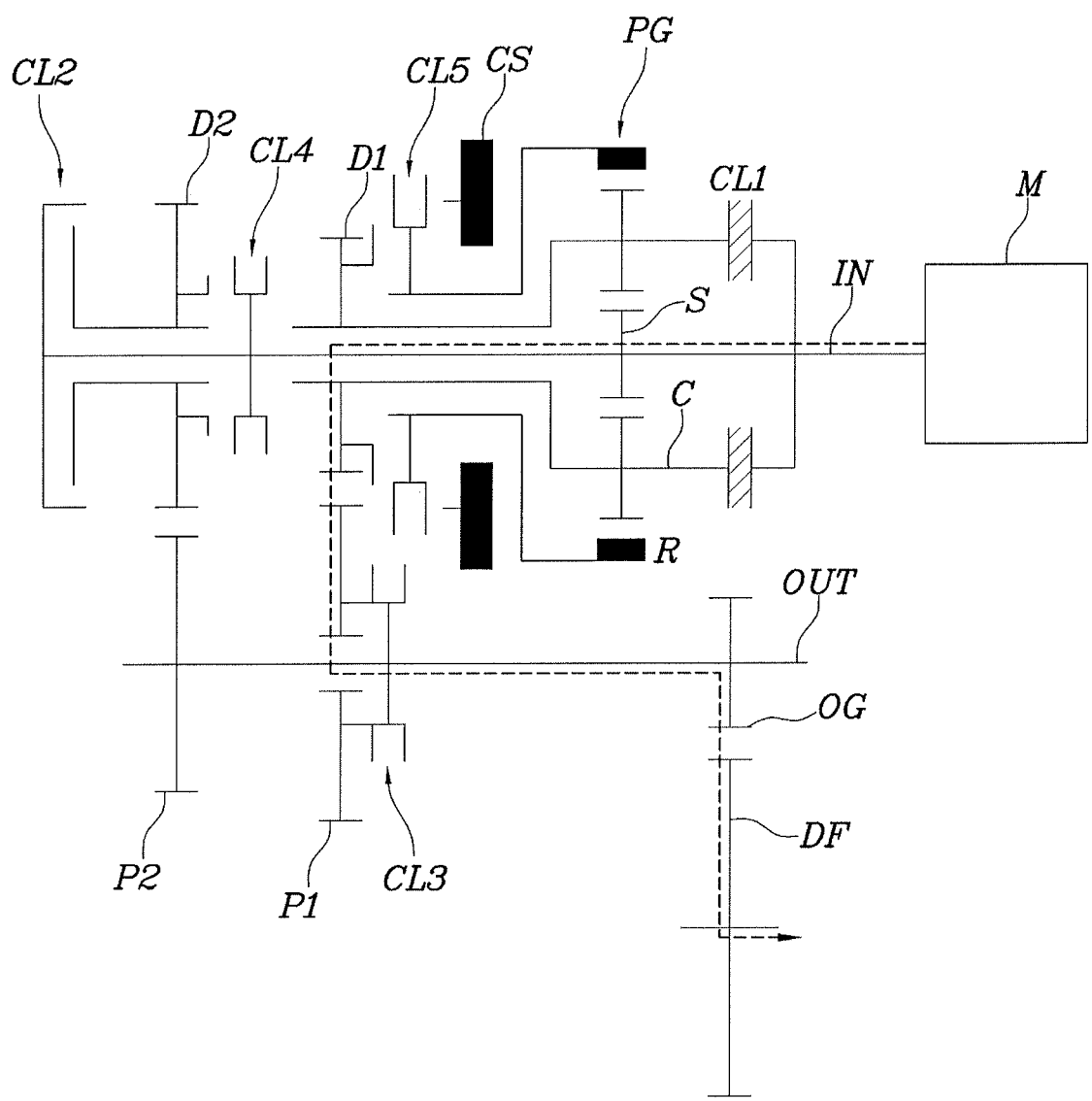

FIG. 11 is a diagram showing a state in which the second clutch CL2 is released and, simultaneously, the first clutch CL1 is engaged, the second clutch CL2 is completely released, and the first clutch CL1 is completely engaged. Thus, the planetary gear set PG may transmit power of the driving motor M to the first drive gear D1 without change while all rotation elements integrally rotate by engaging the first clutch CL1. The power may be supplied to the output gear OG while a 3-stage change gear ratio is formed with only a change gear ratio of the first drive gear D1 and the first driven gear P1.

Figure 12:
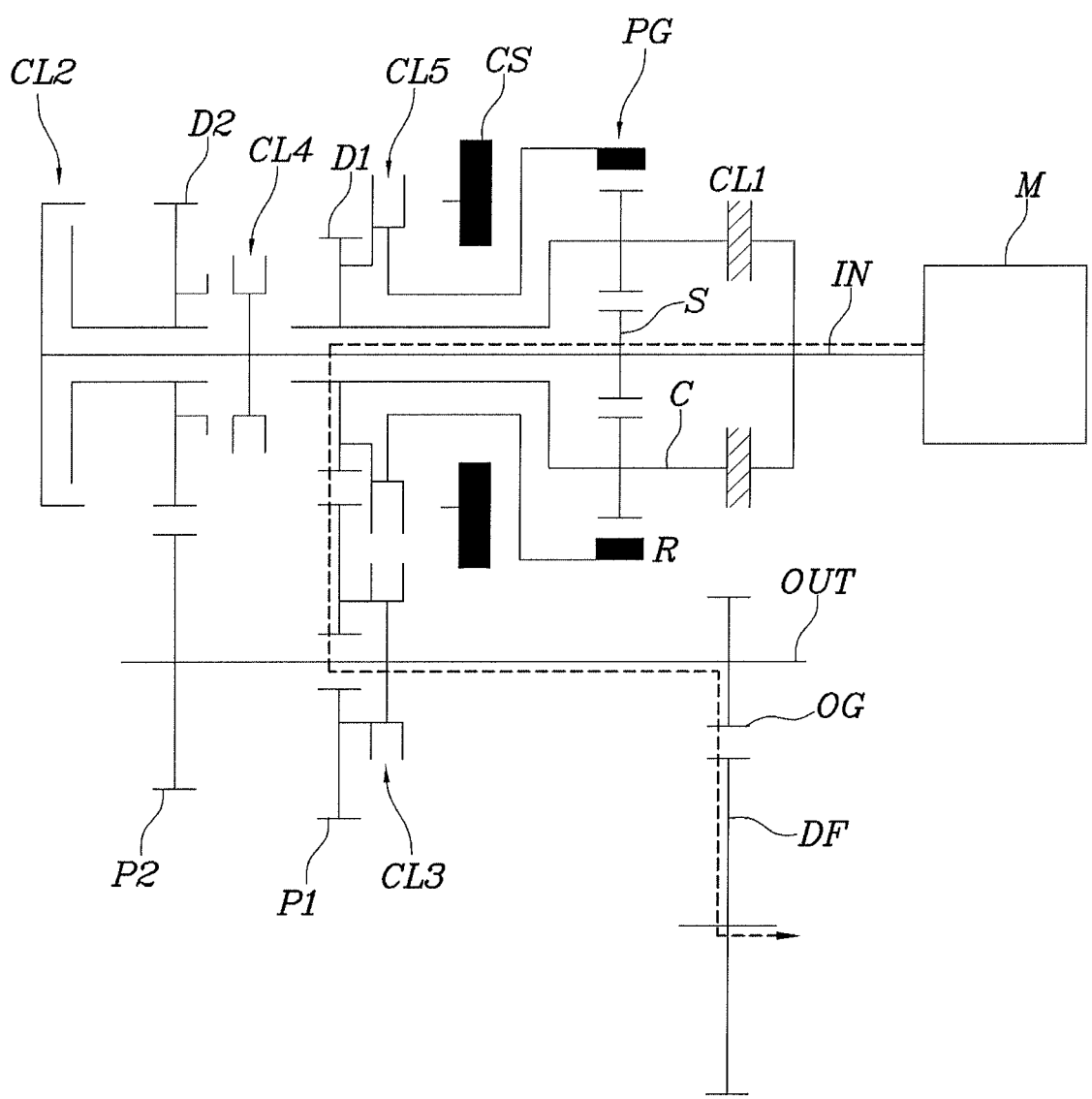
Figure 13:
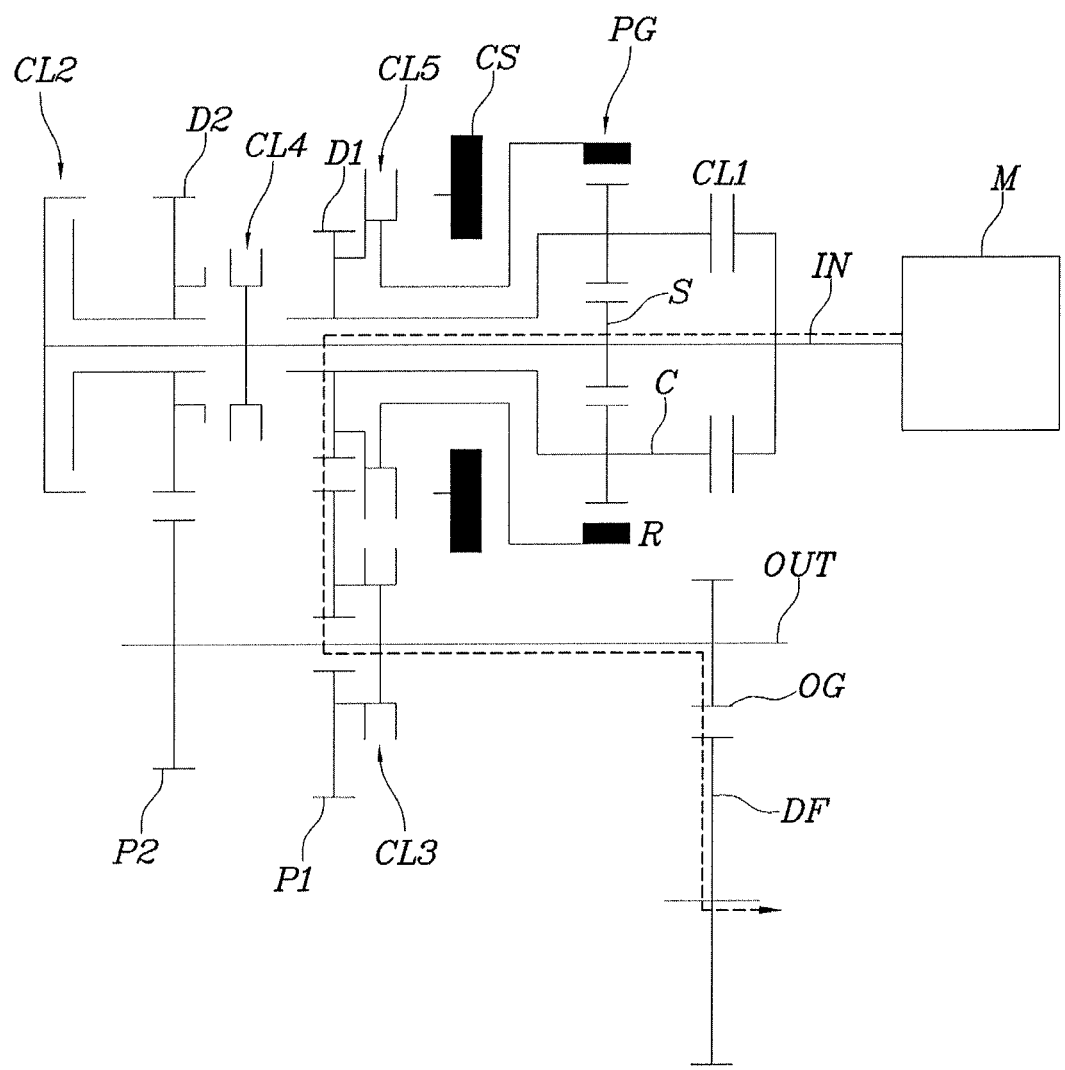

FIG. 12 is a diagram showing a state in which the ring gear R is coupled to the first drive gear D1 from the state of FIG. 11 by the fifth clutch CL5 and FIG. 13 is a diagram showing a state in which the first clutch CL1 is released from the state of FIG. 12 and, thus, the planetary gear set PG is integrated by the fifth clutch CL5 to transmit power of the driving motor M to the first drive gear D1 without change even in a state in which the first clutch CL1 is completely released.

Accordingly, power transmitted to the first drive gear D1 may be changed to a 3-stage change gear ratio by only the first drive gear D1 and the first driven gear P1 and may be supplied to the differential DF through the output gear OG.

During the above transmissions procedure, torque interruption in which power is disconnected may not occur in any situation and, thus, excellent change speed quality may be ensured and separate power may not be consumed to maintain each constant change speed stage, ensuring overall excellent power efficiency of a vehicle.

Figure 14:
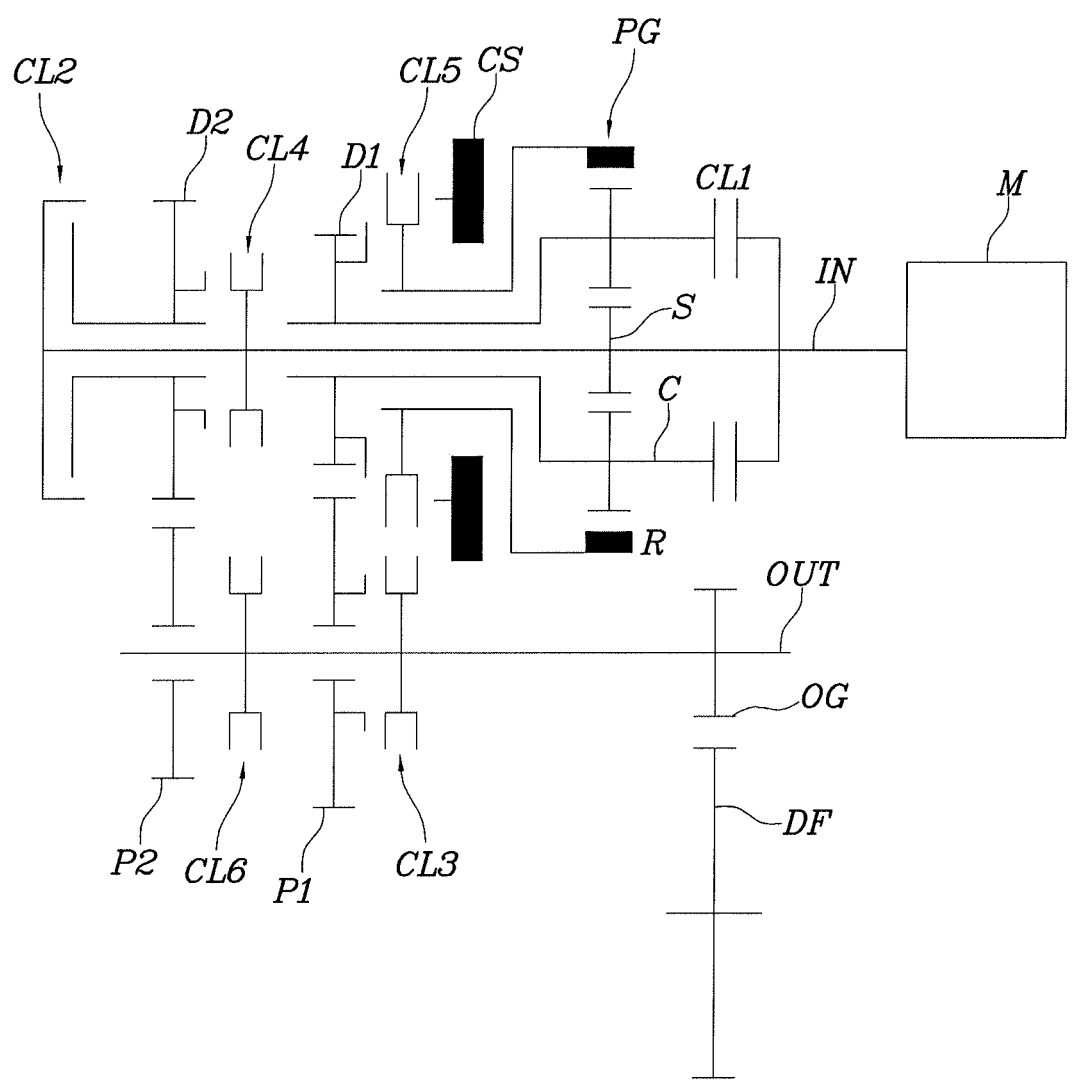
FIG. 14 is a diagram showing a transmission of a motor driving vehicle according to various exemplary embodiments of the present invention.

FIG. 14 is a diagram showing a transmission of a motor driving vehicle according to various exemplary embodiments of the present invention and the transmission of the motor driving vehicle according to various exemplary embodiments of the present invention may include the input shaft IN connected to the driving motor M and including the first clutch CL1 and the second clutch CL2, the planetary gear set PG including the first rotation element directly connected to the input shaft IN, the second rotation element connected to the input shaft IN through the first clutch CL1, and the third rotation element being able to be restrained from rotation, the first drive gear D1 integrated into the second rotation element of the planetary gear set PG, the output shaft OUT including the output gear OG and disposed in parallel to the input shaft IN, the first driven gear P1 engaged with the first drive gear D1 and rotatably disposed on the output shaft OUT, the second drive gear D2 rotatably disposed on the input shaft IN to be connected to the input shaft IN through the second clutch CL2, the second driven gear P2 engaged with the second drive gear D2 and rotatably disposed on the output shaft OUT, the third clutch CL3 disposed to connect or disconnect the first driven gear P1 to or from the output shaft OUT, the fourth clutch CL4 configured to connect the second drive gear D2 to the input shaft IN, the fifth clutch CL5 disposed to connect the third rotation element of the planetary gear set PG to the first drive gear D1 or to restrain rotation, and a sixth clutch CL6 disposed to connect or disconnect the second driven gear P2 to or from the output shaft OUT.

That is, compared with the exemplary embodiment of FIG. 1, the transmission according to the various exemplary embodiments may further include the sixth clutch CL6 and has almost the same detailed operation as the above embodiment but is different in that the second driven gear P2 needs to be controlled to be connected to the output shaft OUT in a state in which power is transmitted through the second driven gear P2.

Figure 15:
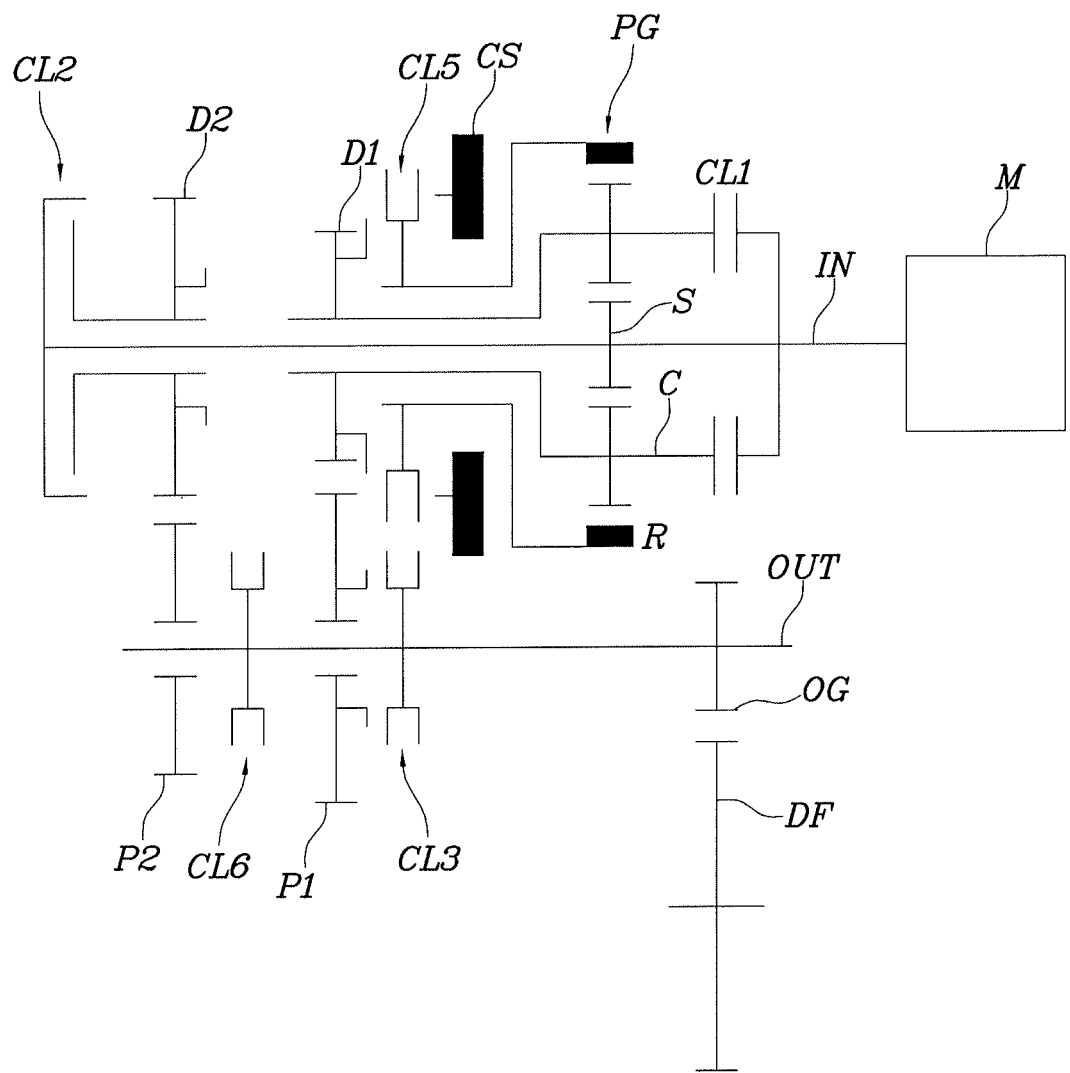
FIG. 15 is a diagram showing a transmission of a motor driving vehicle according to various exemplary embodiments of the present invention.

FIG. 15 is a diagram showing a transmission of a motor driving vehicle according to various exemplary embodiments of the present invention and the transmission of the motor driving vehicle according to various exemplary embodiments of the present invention may include the input shaft IN connected to the driving motor M and including the first clutch CL1 and the second clutch CL2, the planetary gear set PG including the first rotation element directly connected to the input shaft IN, the second rotation element connected to the input shaft IN through the first clutch CL1, and the third rotation element being able to be restrained from rotation, the first drive gear D1 integrated into the second rotation element of the planetary gear set PG, the output shaft OUT including the output gear OG and disposed in parallel to the input shaft IN, the first driven gear P1 engaged with the first drive gear D1 and rotatably disposed on the output shaft OUT, the second drive gear D2 rotatably disposed on the input shaft IN to be connected to the input shaft IN through the second clutch CL2, the second driven gear P2 engaged with the second drive gear D2 and rotatably disposed on the output shaft OUT, the third clutch CL3 disposed to connect or disconnect the first driven gear P1 to or from the output shaft OUT, the fifth clutch CL5 disposed to connect the third rotation element of the planetary gear set PG to the first drive gear D1 or to restrain rotation, and the sixth clutch CL6 disposed to connect or disconnect the second driven gear P2 to or from the output shaft OUT.

That is, the transmission according to the various exemplary embodiments is different from the exemplary embodiment of FIG. 1 only in that the fourth clutch CL4 is removed and the sixth clutch CL6 is included. Accordingly, in the various exemplary embodiments of the present invention, a state in which the second clutch CL2 is engaged and the sixth clutch CL6 is engaged needs to be maintained to embody a 2-stage.

The present invention may provide a high reduction change gear ratio while reducing a size and weight of a transmission by reducing a wheel space of the transmission and minimizing the number of used gears to embody a compact configuration and, thus, driving performance such as highest speed, acceleration performance, and hill-climbing capability may be sufficiently ensured while a driving motor with as small capacity as possible is used and fuel efficiency may be enhanced and required driving performance of a vehicle may be ensured while a cost for vehicle manufacture is reduced, lastly maximizing productivity of the vehicle.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission apparatus of a vehicle, comprising:
an input shaft fixedly connected to a driving motor;
a first clutch and a second clutch mounted to the input shaft;
a planetary gear set including a first rotation element fixedly connected to the input shaft, a second rotation element engaged to the first rotation element and selectively connectable to the input shaft through the first clutch, and a third rotation element engaged to the second rotation element and selectively connectable to a transmission housing;
a first drive gear fixedly connected to the second rotation element of the planetary gear set;
an output shaft disposed in parallel to the input shaft, wherein an output gear is fixedly mounted to the output shaft;
a first driven gear rotatably disposed on the output shaft and engaged with the first drive gear;
a second drive gear rotatably disposed on the input shaft and selectively connectable to the input shaft through the second clutch;
a second driven gear fixedly mounted on the output shaft and engaged with the second drive gear;
a third clutch mounted to the output shaft and selectively connecting the first driven gear to the output shaft;
a fourth clutch selectively connecting the second drive gear to the input shaft; and
a fifth clutch selectively connecting the third rotation element of the planetary gear set to the first drive gear or to the transmission housing.

2. The transmission apparatus of claim 1, wherein the planetary gear set is a single pinion planetary gear set; and
wherein the first rotation element of the planetary gear set is a sun gear, the second rotation element is a planet carrier, and the third rotation element is a ring gear.

3. The transmission apparatus of claim 1, wherein the first clutch and the second clutch include a friction clutch with adjustable transfer torque; and
wherein the third clutch, the fourth clutch, and the fifth clutch include a gear engagement-type clutch having no power consumption while being maintained in an engagement state.

4. The transmission apparatus of claim 3, wherein the gear engagement-type clutch includes a synchronization engagement device including a synchronizer ring configured to perform a synchronization operation.

5. The transmission apparatus of claim 3, wherein the gear engagement-type clutch includes a dog clutch.

6. A transmission apparatus of a vehicle, comprising:
an input shaft fixedly connected to a driving motor;
a first clutch and a second clutch mounted to the input shaft;
a planetary gear set including a first rotation element fixedly connected to the input shaft, a second rotation element engaged to the first rotation element and selectively connectable to the input shaft through the first clutch, and a third rotation element engaged to the second rotation element and selectively connectable to a transmission housing
a first drive gear fixedly connected to the second rotation element of the planetary gear set;
an output shaft disposed in parallel to the input shaft, wherein an output gear is fixedly mounted to the output shaft;
a first driven gear rotatably disposed on the output shaft and engaged with the first drive gear;
a second drive gear rotatably disposed on the input shaft and selectively connectable to the input shaft through the second clutch;
a second driven gear rotatably disposed on the output shaft and engaged with the second drive gear;
a third clutch mounted to the output shaft and selectively connecting the first driven gear to the output shaft;
a fourth clutch selectively connecting the second drive gear to the input shaft;
a fifth clutch selectively connecting the third rotation element of the planetary gear set to the first drive gear or to the transmission housing; and a sixth clutch fixedly mounted to the output shaft and selectively connecting the second driven gear to the output shaft.

7. A transmission apparatus of a vehicle, comprising:

an input shaft fixedly connected to a driving motor;

a first clutch and a second clutch mounted to the input shaft;

a planetary gear set including a first rotation element fixedly connected to the input shaft, a second rotation element engaged to the first rotation element and selectively connectable to the input shaft through the first clutch, and a third rotation element engaged to the second rotation element and selectively connectable to a transmission housing;

a first drive gear fixedly connected to the second rotation element of the planetary gear set;

an output shaft disposed in parallel to the input shaft, wherein an output gear is fixedly mounted to the output shaft;

a first driven gear rotatably disposed on the output shaft and engaged with the first drive gear;

a second drive gear rotatably disposed on the input shaft and selectively connectable to the input shaft through the second clutch;

a second driven gear rotatably disposed on the output shaft and engaged with the second drive gear;

a third clutch mounted to the output shaft and selectively connecting the first driven gear to the output shaft;

a fifth clutch selectively connecting the third rotation element of the planetary gear set to the first drive gear or the transmission housing; and a sixth clutch fixedly mounted to the output shaft and selectively connecting the second driven gear to the output shaft.

* * * * *